(12) United States Patent
Duan et al.

(10) Patent No.: US 12,469,160 B2
(45) Date of Patent: Nov. 11, 2025

(54) ARTIFICIAL INTELLIGENCE MODELING TECHNIQUES FOR VISION-BASED OCCUPANCY DETERMINATION

(71) Applicant: Tesla, Inc., Austin, TX (US)

(72) Inventors: Pengfei Duan, Austin, TX (US); Nishant Desai, Austin, TX (US); Philip Lee, Austin, TX (US); Ashok Elluswamy, Austin, TX (US)

(73) Assignee: Tesla, Inc., Austin, TX (US)

( * ) Notice: Subject to any disclaimer, the term of this patent is extended or adjusted under 35 U.S.C. 154(b) by 0 days.

(21) Appl. No.: 18/440,764

(22) Filed: Feb. 13, 2024

(65) Prior Publication Data

US 2024/0185445 A1 Jun. 6, 2024

Related U.S. Application Data

(63) Continuation of application No. PCT/US2023/032214, filed on Sep. 7, 2023.

(60) Provisional application No. 63/377,954, filed on Sep. 30, 2022, provisional application No. 63/375,199, filed on Sep. 9, 2022.

(51) Int. Cl.
*G06T 7/62* (2017.01)
*B60W 60/00* (2020.01)
*G06T 15/08* (2011.01)

(52) U.S. Cl.
CPC ............. *G06T 7/62* (2017.01); *G06T 15/08* (2013.01); *B60W 60/001* (2020.02); *B60W 2420/403* (2013.01); *G06T 2207/20081* (2013.01); *G06T 2207/30252* (2013.01)

(58) Field of Classification Search
CPC . G06T 7/62; G06T 15/08; G06T 2207/20081; G06T 2207/30252; B60W 60/001; B60W 2420/40
See application file for complete search history.

(56) References Cited

U.S. PATENT DOCUMENTS

| | | |
|---|---|---|
| 9,390,128 B1 | 7/2016 | Seetala |
| 10,216,217 B1 | 2/2019 | Santan et al. |
| 2004/0105573 A1 | 6/2004 | Neumann et al. |

(Continued)

FOREIGN PATENT DOCUMENTS

CN 104200445 B 12/2014

OTHER PUBLICATIONS

Foreign Office Action on PCT PCT/US2023/032214 dated Oct. 31, 2023 (2 pages).

(Continued)

*Primary Examiner* — Michelle Chin
(74) *Attorney, Agent, or Firm* — Foley & Lardner LLP

(57) ABSTRACT

Disclosed herein are methods and systems for using artificial intelligence modeling techniques to train and execute an artificial intelligence model to analyze camera feed received from an ego to generate an occupancy data indicating whether different voxels within the ego's surroundings are occupied by an object having mass. A method comprises inputting, using a camera of an ego object, image data of a space around the ego object into an artificial intelligence model; predicting, by executing the artificial intelligence model, an occupancy attribute of a plurality of voxels; and generating a dataset based on the plurality of voxels and their corresponding occupancy attribute.

20 Claims, 6 Drawing Sheets

(56) References Cited

U.S. PATENT DOCUMENTS

| | | |
|---|---|---|
| 2006/0182431 A1 | 8/2006 | Kobayashi et al. |
| 2008/0307240 A1 | 12/2008 | Dahan et al. |
| 2010/0115047 A1 | 5/2010 | Briscoe et al. |
| 2011/0187924 A1 | 8/2011 | Toraichi et al. |
| 2017/0004157 A1 | 1/2017 | Varadarajan et al. |
| 2017/0162177 A1 | 6/2017 | Lebeck et al. |
| 2018/0336481 A1* | 11/2018 | Guttmann ........... G06F 21/6218 |
| 2019/0035101 A1 | 1/2019 | Kwant et al. |
| 2019/0197778 A1 | 6/2019 | Sachdeva et al. |
| 2019/0286478 A1 | 9/2019 | Sengupta et al. |
| 2019/0310627 A1 | 10/2019 | Halder et al. |
| 2019/0310650 A1* | 10/2019 | Halder .................. G06N 3/08 |
| 2019/0382007 A1 | 12/2019 | Casas et al. |
| 2020/0135014 A1 | 4/2020 | Gonzalez et al. |
| 2020/0232800 A1 | 7/2020 | Bai et al. |
| 2020/0327702 A1 | 10/2020 | Wang et al. |
| 2020/0377105 A1 | 12/2020 | Murashkin et al. |
| 2020/0380257 A1 | 12/2020 | He et al. |
| 2020/0387799 A1 | 12/2020 | Vivekraja et al. |
| 2020/0410259 A1 | 12/2020 | Srinivasan |
| 2021/0009166 A1 | 1/2021 | Li et al. |
| 2021/0049465 A1 | 2/2021 | Bogdan et al. |
| 2021/0061294 A1 | 3/2021 | Doemling et al. |
| 2021/0081780 A1 | 3/2021 | Tawari et al. |
| 2021/0101590 A1 | 4/2021 | Finelt et al. |
| 2021/0103776 A1* | 4/2021 | Jiang .................. G06T 19/20 |
| 2021/0213973 A1* | 7/2021 | Carillo Peña .......... G06N 3/063 |
| 2021/0255635 A1 | 8/2021 | Vora et al. |
| 2021/0271258 A1* | 9/2021 | Tran .................. B60R 11/04 |
| 2021/0272308 A1* | 9/2021 | Dinh .................. G06N 3/045 |
| 2021/0281867 A1 | 9/2021 | Golinski et al. |
| 2021/0357791 A1 | 11/2021 | Loginov |
| 2021/0398338 A1* | 12/2021 | Philion ................ G06V 10/774 |
| 2022/0024485 A1* | 1/2022 | Theverapperuma ... G06V 20/58 |
| 2022/0026920 A1* | 1/2022 | Ebrahimi Afrouzi .... G06N 7/01 |
| 2022/0044114 A1 | 2/2022 | Sriram et al. |
| 2022/0044359 A1 | 2/2022 | Harrison |
| 2022/0139618 A1 | 5/2022 | Kang et al. |
| 2022/0147808 A1 | 5/2022 | Ming Chang et al. |
| 2022/0292699 A1* | 9/2022 | Zhu .......................... G06T 7/90 |

OTHER PUBLICATIONS

International Search Report and Written Opinion on PCT App. PCT/US2023/034091 dated Feb. 2, 2024 (14 pages).

International Search Report and Written Opinion on PCT App. PCT/US2023/075631 dated Jan. 19, 2024 (14 pages).

International Search Report and Written Opinion on PCT matter PCT/US2023/032214 dated Jan. 31, 2024 (20 pages).

ISR and WO on PCT patent application No. PCR/US2023/034168 dated Jan. 9, 2024 (27 pages).

ISR and WO on PCT patent application No. PCT/US2023/034173 dated Jan. 3, 2024 (14 pages).

ISR and WO on PCT patent application No. PCT/US2023/034235 dated Jan. 11, 2024 (7 pages).

ISR and WO on PCT patent application No. PCT/US2023/075632 dated Jan. 12, 2024 (15 pages).

ISR and WO on PCT patent application No. PCT/US2023/34233 dated Jan. 12, 2024 (14 pages).

International Search Report and Written Opinion on PCT app. PCT/US2023/075626 dated Feb. 14, 2024 (9 pages).

Jo et al., "Vehicle Trajectory Prediction Using Hierarchical Graph Neural Network for Considering Interaction among Multimodal Maneuvers", Sensors, Aug. 9, 2021.

Mo et al., "ReCoG: A Deep Learning Framework with Heterogeneous Graph for Interaction-Aware Trajectory Prediction", arXiv, Dec. 19, 2020.

International Search Report and Written Opinion for international App. No. PCT/US2023/034019.

\* cited by examiner

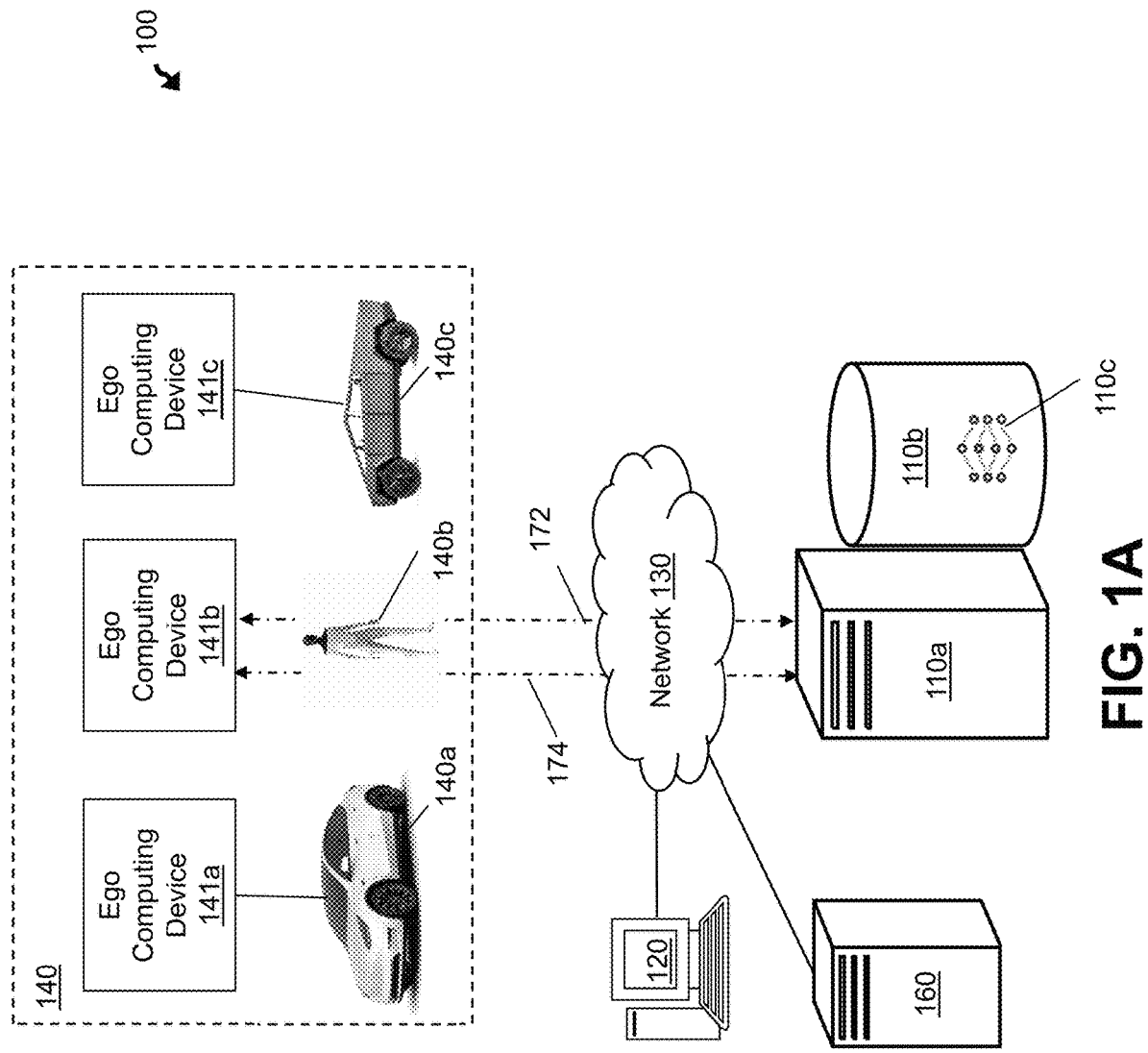

ARTIFICIAL INTELLIGENCE MODELING TECHNIQUES FOR VISION-BASED OCCUPANCY DETERMINATION

CROSS-REFERENCE TO RELATED PATENT APPLICATIONS

The present application is a continuation of PCT Application No. PCT/US2023/032214, filed on Sep. 7, 2023, which claims priority to U.S. Provisional Application No. 63/375,199, filed Sep. 9, 2022, and U.S. Provisional Application No. 63/377,954, filed Sep. 30, 2022, each of which is incorporated herein by reference in its entirety for all purposes.

TECHNICAL FIELD

The present disclosure generally relates to artificial intelligence-based modeling techniques to analyze image data and predict occupancy attributes for an ego's surroundings.

BACKGROUND

Autonomous navigation technology used for autonomous vehicles and robots (collectively, egos) has become ubiquitous due to rapid advancements in computer technology. These advances allow for safer and more reliable autonomous navigation of egos. Egos often need to navigate through complex and dynamic environments and terrains that may include vehicles, traffic, pedestrians, cyclists, and various other static or dynamic obstacles. Understanding the egos' surroundings is necessary for informed and competent decision-making to avoid collisions.

SUMMARY OF THE INVENTION

For the aforementioned reasons, there is a desire for methods and systems that can analyze an ego's surroundings and predict objects having mass present within the ego's surroundings. Specifically, a trained artificial intelligence (AI) model used within a particular AI architecture can predict occupancy data associated with the space surrounding the ego. As used herein, occupancy data or occupancy attributes may refer to whether a defined space is occupied by an object having mass (e.g., occupied or unoccupied).

In an embodiment, a method comprises inputting, by a processor using a camera of an ego object, image data of a space around the ego object into an artificial intelligence model; predicting, by the processor executing the artificial intelligence model, an occupancy attribute of a plurality of voxels; and generating, by the processor, a dataset based on the plurality of voxels and their corresponding occupancy attribute.

The method may further comprise generating, by the processor, an output representing an environment of the ego object and illustrating the plurality of voxels and their corresponding occupancy attribute, wherein the output comprises a graphical indicator of the occupancy attribute for at least a portion of the plurality of voxels.

The graphical indicator may correspond to a detected object associated with the at least the portion of the plurality of voxels.

The method may further comprise displaying, by the processor, the output on a screen associated with the ego object.

The dataset may be a queryable dataset configured to transmit the occupancy attribute of the plurality of voxels to an autonomous driving protocol of the ego object.

The artificial intelligence model may be trained using a sensor attribute of the plurality of voxels.

The ego object may be an autonomous vehicle executing a driving protocol based on the dataset.

The method may further comprise featurizing, by the processor, the image data prior to executing the artificial intelligence model.

The image data may comprise a plurality of camera feeds from a plurality of cameras of the ego object, the method may further comprise temporally aligning, by the processor, the plurality of camera feeds.

In another embodiment, an ego object comprises a camera; a first processor; a second processor; a non-transitory computer-readable medium containing an artificial intelligence model configured to be executed by the first processor, wherein the first processor is configured to input, using the camera of the ego object, image data of a space around the ego object into the artificial intelligence model; predict, executing the artificial intelligence model, an occupancy attribute of a plurality of voxels; and generate a dataset based on the plurality of voxels and their corresponding occupancy attribute, wherein the second processor is configured to autonomously navigate the ego object using the dataset.

The first processor may be further configured to generate an output representing an environment of the ego object and illustrating the plurality of voxels and their corresponding occupancy attribute, wherein the output comprises a graphical indicator of the occupancy attribute for at least a portion of the plurality of voxels.

The graphical indicator may correspond to a detected object associated with the at least the portion of the plurality of voxels.

The first processor may be further configured to display the output on a screen associated with the ego object.

The artificial intelligence model may be trained using a sensor attribute of the plurality of voxels.

The ego object may be an autonomous vehicle executing a driving protocol based on the dataset.

In another embodiment, a method comprises training, by a processor, an artificial intelligence model using a training dataset comprising data received from a camera of an ego object, the training dataset having a set of data points where each data point within the set of data points corresponds to a location and an image attribute of at least one voxel of space around the ego object, whereby the artificial intelligence model correlates each data point within the first set of data points with a corresponding data point within the second set of data points using each data point's respective location, whereby, when the artificial intelligence model is trained, the artificial intelligence model is configured to receive a camera feed from a second ego object and predict a third set of data points where each data point within the third set of data points corresponds an occupancy attribute indicating whether at least one voxel of space around the second ego object is occupied by any object having mass.

The artificial intelligence model may be further configured to generate an output representing an environment of the ego object and illustrating the at least one voxel and their corresponding occupancy attribute.

The training dataset may further comprise a second set of data points where each data point within the second set of data points corresponds to the location and a sensor attribute of at least one voxel of the space around the ego object.

A graphical indicator may correspond to a detected object associated with the at least portion of the at least one voxel.

The artificial intelligence model uses a three-dimensional multiview reconstruction protocol to generate the output.

BRIEF DESCRIPTION OF THE DRAWINGS

Non-limiting embodiments of the present disclosure are described by way of example concerning the accompanying figures, which are schematic and are not intended to be drawn to scale. Unless indicated as representing the background art, the figures represent aspects of the disclosure.

FIG. 1A illustrates components of an AI-enabled visual data analysis system, according to an embodiment.

DETAILED DESCRIPTION

Figure 1B:
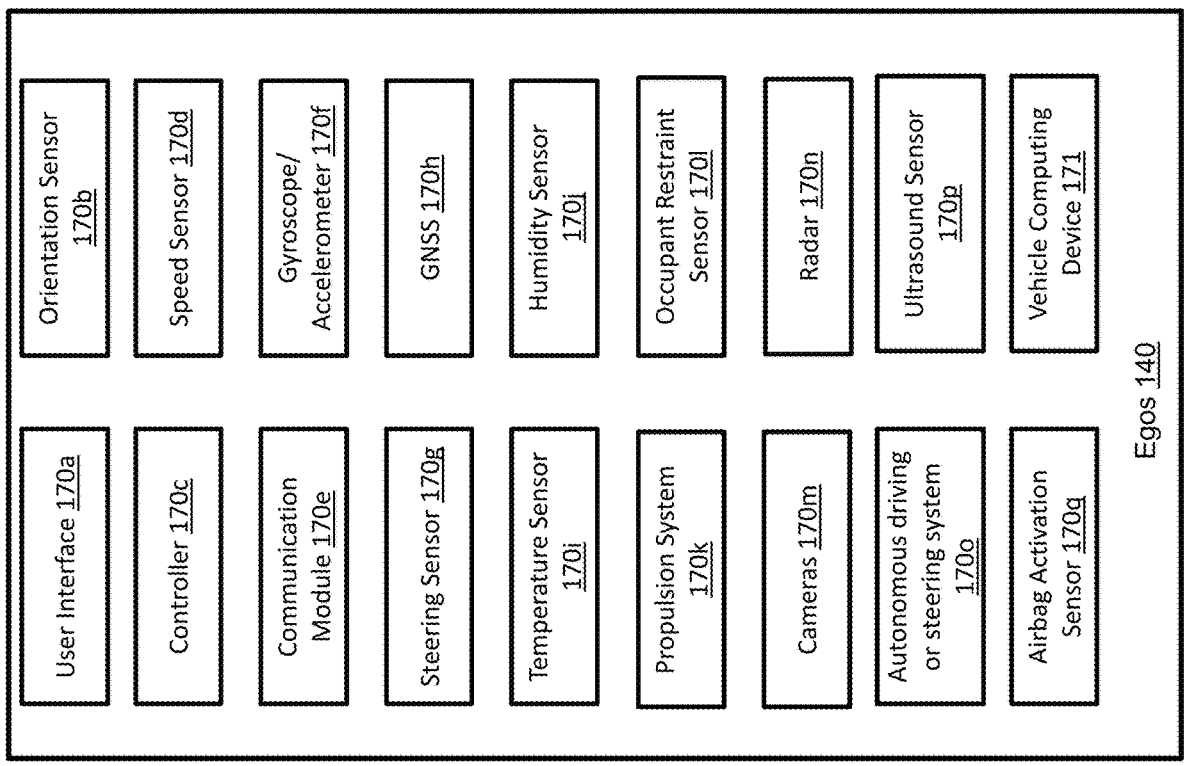
FIG. 1B illustrates various sensors associated with an ego according to an embodiment.

Reference will now be made to the illustrative embodiments depicted in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one skilled in the relevant art and having possession of this disclosure, are to be considered within the scope of the subject matter disclosed herein. Other embodiments may be used and/or other changes may be made without departing from the spirit or scope of the present disclosure. The illustrative embodiments described in the detailed description are not meant to be limiting to the subject matter presented.

By implementing the methods discussed herein, a system may use a trained AI model to determine the occupancy status of different voxels of an image (or a video) of an ego's surroundings. The ego may be an autonomous vehicle (e.g., car, truck, bus, motorcycle, all-terrain vehicle, cart), a robot, or other automated device. The ego may be configured to operate on a production line, within a building, home, or medical center or transport humans, deliver cargo, perform military functions, and the like. Within these environments, the ego may navigate amongst known or unknown paths to accomplish particular tasks or travel to particular destinations. There is a desire to avoid collisions during operation, so the ego seeks to understand the environment. For instance, in the context of an autonomous vehicle or a robot, the system may use a camera (or other visual sensor) to receive real-time or near real-time images of the ego's surroundings. The system may then execute the trained AI model to determine the occupancy status of the ego's surroundings. The AI model may divide the ego's surroundings into different voxels and then determine an occupancy status for each voxel. Accordingly, using the methods discussed herein, the system may generate a map of the ego's surroundings. Using the voxel data (e.g., coordinates of each voxel) and the corresponding occupancy status, the AI model (or sometimes another model using the data predicted by the AI model) may generate a map of the ego's surroundings.

FIG. 1A is a non-limiting example of components of a system in which the methods and systems discussed herein can be implemented. For instance, an analytics server may train an AI model and use the trained AI model to generate an occupancy dataset and/or map for one or more egos. FIG. 1A illustrates components of an AI-enabled visual data analysis system 100. The system 100 may include an analytics server 110a, a system database 110b, an administrator computing device 120, egos 140a-b (collectively ego(s) 140), ego computing devices 141a-c (collectively ego computing devices 141), and a server 160. The system 100 is not confined to the components described herein and may include additional or other components not shown for brevity, which are to be considered within the scope of the embodiments described herein.

The above-mentioned components may be connected through a network 130. Examples of the network 130 may include, but are not limited to, private or public LAN, WLAN, MAN, WAN, and the Internet. The network 130 may include wired and/or wireless communications according to one or more standards and/or via one or more transport mediums.

The communication over the network 130 may be performed in accordance with various communication protocols such as Transmission Control Protocol and Internet Protocol (TCP/IP), User Datagram Protocol (UDP), and IEEE communication protocols. In one example, the network 130 may include wireless communications according to Bluetooth specification sets or another standard or proprietary wireless communication protocol. In another example, the network 130 may also include communications over a cellular network, including, for example, a GSM (Global System for Mobile Communications), CDMA (Code Division Multiple Access), or an EDGE (Enhanced Data for Global Evolution) network.

The system 100 illustrates an example of a system architecture and components that can be used to train and execute one or more AI models, such the AI model(s) 110c. Specifically, as depicted in FIG. 1A and described herein, the analytics server 110a can use the methods discussed herein to train the AI model(s) 110c using data retrieved from the egos 140 (e.g., by using data streams 172 and 174). When the AI model(s) 110c have been trained, each of the egos 140 may have access to and execute the trained AI model(s) 110c. For instance, the vehicle 140a having the ego computing device 141a may transmit its camera feed to the trained AI model(s) 110c and may determine the occupancy status of its surroundings (e.g., data stream 174). Moreover, the data ingested and/or predicted by the AI model(s) 110c with respect to the egos 140 (at inference time) may also be used to improve the AI model(s) 110c. Therefore, the system 100 depicts a continuous loop that can periodically improve the accuracy of the AI model(s) 110c. Moreover, the system 100 depicts a loop in which data received the egos 140 can be used to at training phase in addition to the inference phase.

The analytics server 110a may be configured to collect, process, and analyze navigation data (e.g., images captured while navigating) and various sensor data collected from the egos 140. The collected data may then be processed and prepared into a training dataset. The training dataset may then be used to train one or more AI models, such as the AI model 110c. The analytics server 110a may also be configured to collect visual data from the egos 140. Using the AI model 110c (trained using the methods and systems discussed herein), the analytics server 110a may generate a dataset and/or an occupancy map for the egos 140. The analytics server 110a may display the occupancy map on the egos 140 and/or transmit the occupancy map/dataset to the ego computing devices 141, the administrator computing device 120, and/or the server 160.

In FIG. 1A, the AI model 110c is illustrated as a component of the system database 110b, but the AI model 110c may be stored in a different or a separate component, such as cloud storage or any other data repository accessible to the analytics server 110a.

The analytics server 110a may also be configured to display an electronic platform illustrating various training attributes for training the AI model 110c. The electronic platform may be displayed on the administrator computing device 120, such that an analyst can monitor the training of the AI model 110c. An example of the electronic platform generated and hosted by the analytics server 110a may be a web-based application or a website configured to display the training dataset collected from the egos 140 and/or training status/metrics of the AI model 110c.

The analytics server 110a may be any computing device comprising a processor and non-transitory machine-readable storage capable of executing the various tasks and processes described herein. Non-limiting examples of such computing devices may include workstation computers, laptop computers, server computers, and the like. While the system 100 includes a single analytics server 110a, the system 100 may include any number of computing devices operating in a distributed computing environment, such as a cloud environment.

The egos 140 may represent various electronic data sources that transmit data associated with their previous or current navigation sessions to the analytics server 110a. The egos 140 may be any apparatus configured for navigation, such as a vehicle 140a and/or a truck 140c. The egos 140 are not limited to being vehicles and may include robotic devices as well. For instance, the egos 140 may include a robot 140b, which may represent a general purpose, bipedal, autonomous humanoid robot capable of navigating various terrains. The robot 140b may be equipped with software that enables balance, navigation, perception, or interaction with the physical world. The robot 140b may also include various cameras configured to transmit visual data to the analytics server 110a.

Even though referred to herein as an "ego," the egos 140 may or may not be autonomous devices configured for automatic navigation. For instance, in some embodiments, the ego 140 may be controlled by a human operator or by a remote processor. The ego 140 may include various sensors, such as the sensors depicted in FIG. 1B. The sensors may be configured to collect data as the egos 140 navigate various terrains (e.g., roads). The analytics server 110a may collect data provided by the egos 140. For instance, the analytics server 110a may obtain navigation session and/or road/terrain data (e.g., images of the egos 140 navigating roads) from various sensors, such that the collected data is eventually used by the AI model 110c for training purposes.

As used herein, a navigation session corresponds to a trip where egos 140 travel a route, regardless of whether the trip was autonomous or controlled by a human. In some embodiments, the navigation session may be for data collection and model training purposes. However, in some other embodiments, the egos 140 may refer to a vehicle purchased by a consumer and the purpose of the trip may be categorized as everyday use. The navigation session may start when the egos 140 move from a non-moving position beyond a threshold distance (e.g., 0.1 miles, 100 feet) or exceed a threshold speed (e.g., over 0 mph, over 1 mph, over 5 mph). The navigation session may end when the egos 140 are returned to a non-moving position and/or are turned off (e.g., when a driver exits a vehicle).

The egos 140 may represent a collection of egos monitored by the analytics server 110a to train the AI model(s) 110c. For instance, a driver for the vehicle 140a may authorize the analytics server 110a to monitor data associated with their respective vehicle. As a result, the analytics server 110a may utilize various methods discussed herein to collect sensor/camera data and generate a training dataset to train the AI model(s) 110c accordingly. The analytics server 110a may then apply the trained AI model(s) 110c to analyze data associated with the egos 140 and to predict an occupancy map for the egos 140. Moreover, additional/ongoing data associated with the egos 140 can also be processed and added to the training dataset, such that the analytics server 110a re-calibrates the AI model(s) 110c accordingly. Therefore, the system 100 depicts a loop in which navigation data received from the egos 140 can be used to train the AI model(s) 110c. The egos 140 may include processors that execute the trained AI model(s) 110c for navigational purposes. While navigating, the egos 140 can collect additional data regarding their navigation sessions, and the additional data can be used to calibrate the AI model(s) 110c. That is, the egos 140 represent egos that can be used to train, execute/use, and re-calibrate the AI model(s) 110c. In a non-limiting example, the egos 140 represent vehicles purchased by customers that can use the AI model(s) 110c to autonomously navigate while simultaneously improving the AI model(s) 110c.

The egos 140 may be equipped with various technology allowing the egos to collect data from their surroundings and (possibly) navigate autonomously. For instance, the egos 140 may be equipped with inference chips to run self-driving software.

Figure 1C:
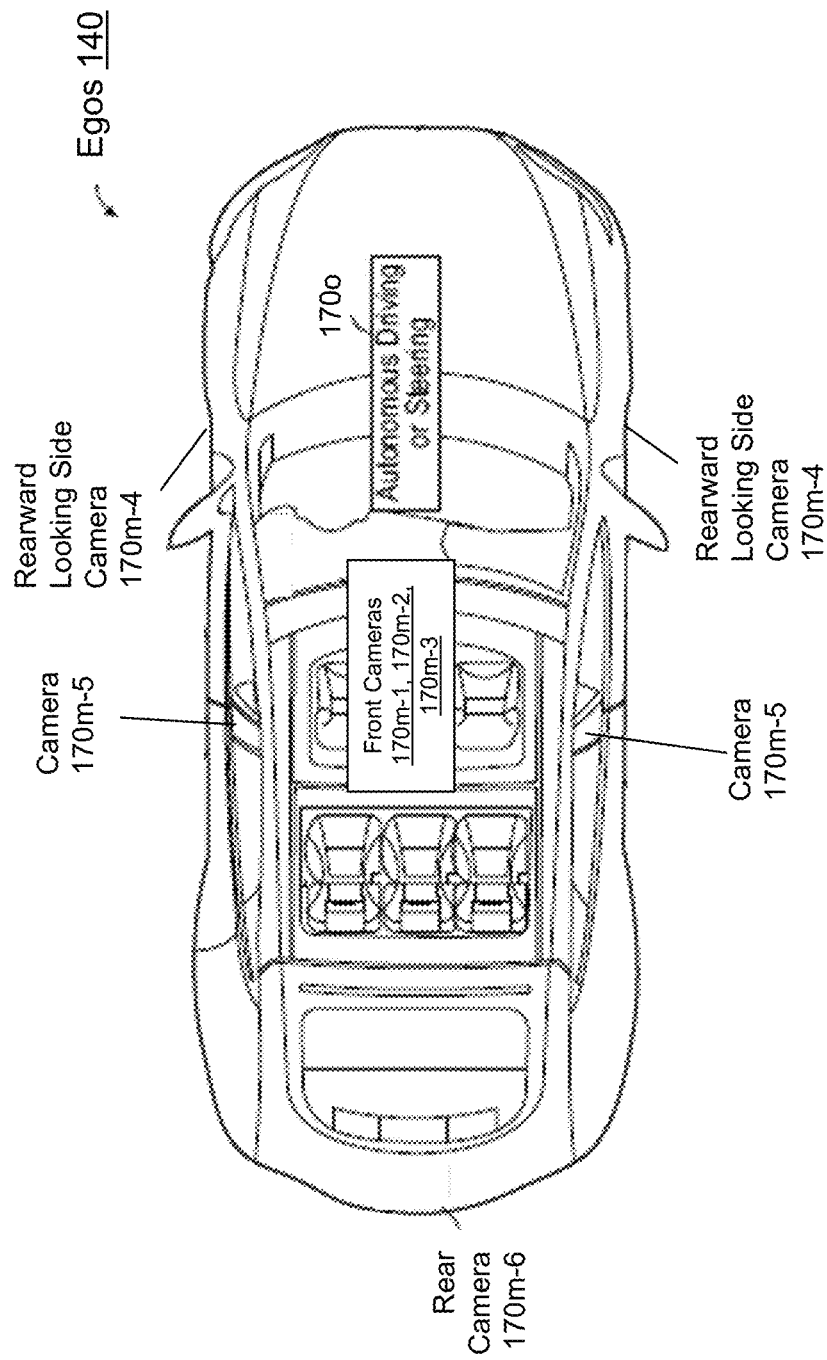
FIG. 1C illustrates the components of a vehicle, according to an embodiment.

Various sensors for each ego 140 may monitor and transmit the collected data associated with different navigation sessions to the analytics server 110a. FIGS. 1B-C illustrate block diagrams of sensors integrated within the egos 140, according to an embodiment. The number and position of each sensor discussed with respect to FIGS. 1B-C may depend on the type of ego discussed in FIG. 1A. For instance, the robot 140b may include different sensors than the vehicle 140a or the truck 140c. For instance, the robot 140b may not include the airbag activation sensor 170q. Moreover, the sensors of the vehicle 140a and the truck 140c may be positioned differently than illustrated in FIG. 1C.

As discussed herein, various sensors integrated within each ego 140 may be configured to measure various data associated with each navigation session. The analytics server 110a may periodically collect data monitored and collected by these sensors, wherein the data is processed in accordance with the methods described herein and used to train the AI model 110c and/or execute the AI model 110c to generate the occupancy map.

The egos 140 may include a user interface 170a. The user interface 170a may refer to a user interface of an ego computing device (e.g., the ego computing devices 141 in FIG. 1A). The user interface 170a may be implemented as a display screen integrated with or coupled to the interior of a vehicle, a heads-up display, a touchscreen, or the like. The user interface 170a may include an input device, such as a touchscreen, knobs, buttons, a keyboard, a mouse, a gesture sensor, a steering wheel, or the like. In various embodiments, the user interface 170a may be adapted to provide user input (e.g., as a type of signal and/or sensor information) to other devices or sensors of the egos 140 (e.g., sensors illustrated in FIG. 1B), such as a controller 170c.

The user interface 170a may also be implemented with one or more logic devices that may be adapted to execute instructions, such as software instructions, implementing any of the various processes and/or methods described herein. For example, the user interface 170a may be adapted to form communication links, transmit and/or receive communications (e.g., sensor signals, control signals, sensor information, user input, and/or other information), or perform various other processes and/or methods. In another example, the driver may use the user interface 170a to control the temperature of the egos 140 or activate its features (e.g., autonomous driving or steering system 1700). Therefore, the user interface 170a may monitor and collect driving session data in conjunction with other sensors described herein. The user interface 170a may also be configured to display various data generated/predicted by the analytics server 110a and/or the AI model 110c.

An orientation sensor 170b may be implemented as one or more of a compass, float, accelerometer, and/or other digital or analog device capable of measuring the orientation of the egos 140 (e.g., magnitude and direction of roll, pitch, and/or yaw, relative to one or more reference orientations such as gravity and/or magnetic north). The orientation sensor 170b may be adapted to provide heading measurements for the egos 140. In other embodiments, the orientation sensor 170b may be adapted to provide roll, pitch, and/or yaw rates for the egos 140 using a time series of orientation measurements. The orientation sensor 170b may be positioned and/or adapted to make orientation measurements in relation to a particular coordinate frame of the egos 140.

A controller 170c may be implemented as any appropriate logic device (e.g., processing device, microcontroller, processor, application-specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of the egos 140. Such software instructions may also implement methods for processing sensor signals, determining sensor information, providing user feedback (e.g., through user interface 170a), querying devices for operational parameters, selecting operational parameters for devices, or performing any of the various operations described herein.

A communication module 170e may be implemented as any wired and/or wireless interface configured to communicate sensor data, configuration data, parameters, and/or other data and/or signals to any feature shown in FIG. 1A (e.g., analytics server 110a). As described herein, in some embodiments, communication module 170e may be implemented in a distributed manner such that portions of communication module 170e are implemented within one or more elements and sensors shown in FIG. 1B. In some embodiments, the communication module 170e may delay communicating sensor data. For instance, when the egos 140 do not have network connectivity, the communication module 170e may store sensor data within temporary data storage and transmit the sensor data when the egos 140 are identified as having proper network connectivity.

A speed sensor 170d may be implemented as an electronic pitot tube, metered gear or wheel, water speed sensor, wind speed sensor, wind velocity sensor (e.g., direction and magnitude), and/or other devices capable of measuring or determining a linear speed of the egos 140 (e.g., in a surrounding medium and/or aligned with a longitudinal axis of the egos 140) and providing such measurements as sensor signals that may be communicated to various devices.

A gyroscope/accelerometer 170f may be implemented as one or more electronic sextants, semiconductor devices, integrated chips, accelerometer sensors, or other systems or devices capable of measuring angular velocities/accelerations and/or linear accelerations (e.g., direction and magnitude) of the egos 140, and providing such measurements as sensor signals that may be communicated to other devices, such as the analytics server 110a. The gyroscope/accelerometer 170f may be positioned and/or adapted to make such measurements in relation to a particular coordinate frame of the egos 140. In various embodiments, the gyroscope/accelerometer 170f may be implemented in a common housing and/or module with other elements depicted in FIG. 1B to ensure a common reference frame or a known transformation between reference frames.

A global navigation satellite system (GNSS) 170h may be implemented as a global positioning satellite receiver and/or another device capable of determining absolute and/or relative positions of the egos 140 based on wireless signals received from space-born and/or terrestrial sources, for example, and capable of providing such measurements as sensor signals that may be communicated to various devices. In some embodiments, the GNSS 170h may be adapted to determine the velocity, speed, and/or yaw rate of the egos 140 (e.g., using a time series of position measurements), such as an absolute velocity and/or a yaw component of an angular velocity of the egos 140.

A temperature sensor 170i may be implemented as a thermistor, electrical sensor, electrical thermometer, and/or other devices capable of measuring temperatures associated with the egos 140 and providing such measurements as sensor signals. The temperature sensor 170i may be configured to measure an environmental temperature associated with the egos 140, such as a cockpit or dash temperature, for example, which may be used to estimate a temperature of one or more elements of the egos 140.

A humidity sensor 170j may be implemented as a relative humidity sensor, electrical sensor, electrical relative humidity sensor, and/or another device capable of measuring a relative humidity associated with the egos 140 and providing such measurements as sensor signals.

A steering sensor 170g may be adapted to physically adjust a heading of the egos 140 according to one or more control signals and/or user inputs provided by a logic device, such as controller 170c. Steering sensor 170g may include one or more actuators and control surfaces (e.g., a rudder or other type of steering or trim mechanism) of the egos 140, and may be adapted to physically adjust the control surfaces to a variety of positive and/or negative steering angles/positions. The steering sensor 170g may also be adapted to sense a current steering angle/position of such steering mechanism and provide such measurements.

A propulsion system 170k may be implemented as a propeller, turbine, or other thrust-based propulsion system, a mechanical wheeled and/or tracked propulsion system, a wind/sail-based propulsion system, and/or other types of propulsion systems that can be used to provide motive force to the egos 140. The propulsion system 170k may also monitor the direction of the motive force and/or thrust of the egos 140 relative to a coordinate frame of reference of the egos 140. In some embodiments, the propulsion system 170k may be coupled to and/or integrated with the steering sensor 170g.

An occupant restraint sensor 170l may monitor seatbelt detection and locking/unlocking assemblies, as well as other passenger restraint subsystems. The occupant restraint sensor 170l may include various environmental and/or status sensors, actuators, and/or other devices facilitating the operation of safety mechanisms associated with the operation of the egos 140. For example, occupant restraint sensor 170l may be configured to receive motion and/or status data from other sensors depicted in FIG. 1B. The occupant restraint sensor 170l may determine whether safety measurements (e.g., seatbelts) are being used.

Cameras 170m may refer to one or more cameras integrated within the egos 140 and may include multiple cameras integrated (or retrofitted) into the ego 140, as depicted in FIG. 1C. The cameras 170m may be interior- or exterior-facing cameras of the egos 140. For instance, as depicted in FIG. 1C, the egos 140 may include one or more interior-facing cameras that may monitor and collect footage of the occupants of the egos 140. The egos 140 may include eight exterior facing cameras. For example, the egos 140 may include a front camera 170m-1, a forward-looking side camera 170m-2, a forward-looking side camera 170m-3, a rearward looking side camera 170m-4 on each front fender, a camera 170m-5 (e.g., integrated within a B-pillar) on each side, and a rear camera 170m-6.

Referring to FIG. 1B, a radar 170n and ultrasound sensors 170p may be configured to monitor the distance of the egos 140 to other objects, such as other vehicles or immobile objects (e.g., trees or garage doors). The egos 140 may also include an autonomous driving or steering system 1700 configured to use data collected via various sensors (e.g., radar 170n, speed sensor 170d, and/or ultrasound sensors 170p) to autonomously navigate the ego 140.

Therefore, autonomous driving or steering system 1700 may analyze various data collected by one or more sensors described herein to identify driving data. For instance, autonomous driving or steering system 1700 may calculate a risk of forward collision based on the speed of the ego 140 and its distance to another vehicle on the road. The autonomous driving or steering system 1700 may also determine whether the driver is touching the steering wheel. The autonomous driving or steering system 1700 may transmit the analyzed data to various features discussed herein, such as the analytics server.

An airbag activation sensor 170q may anticipate or detect a collision and cause the activation or deployment of one or more airbags. The airbag activation sensor 170q may transmit data regarding the deployment of an airbag, including data associated with the event causing the deployment.

Referring back to FIG. 1A, the administrator computing device 120 may represent a computing device operated by a system administrator. The administrator computing device 120 may be configured to display data retrieved or generated by the analytics server 110a (e.g., various analytic metrics and risk scores), wherein the system administrator can monitor various models utilized by the analytics server 110a, review feedback, and/or facilitate the training of the AI model(s) 110c maintained by the analytics server 110a.

The ego(s) 140 may be any device configured to navigate various routes, such as the vehicle 140a or the robot 140b. As discussed with respect to FIGS. 1B-C, the ego 140 may include various telemetry sensors. The egos 140 may also include ego computing devices 141. Specifically, each ego may have its own ego computing device 141. For instance, the truck 140c may have the ego computing device 141c. For brevity, the ego computing devices are collectively referred to as the ego computing device(s) 141. The ego computing devices 141 may control the presentation of content on an infotainment system of the egos 140, process commands associated with the infotainment system, aggregate sensor data, manage communication of data to an electronic data source, receive updates, and/or transmit messages. In one configuration, the ego computing device 141 communicates with an electronic control unit. In another configuration, the ego computing device 141 is an electronic control unit. The ego computing devices 141 may comprise a processor and a non-transitory machine-readable storage medium capable of performing the various tasks and processes described herein. For example, the AI model(s) 110c described herein may be stored and performed (or directly accessed) by the ego computing devices 141. Non-limiting examples of the ego computing devices 141 may include a vehicle multimedia and/or display system.

In one example of how the AI model(s) 110c can be trained, the analytics server 110a may collect data from egos 140 to train the AI model(s) 110c. Before executing the AI model(s) 110c to generate/predict an occupancy dataset, the analytics server 110a may train the AI model (s) 110c using various methods. The training allows the AI model(s) 110c to ingest data from one or more cameras of one or more egos 140 (without the need to receive radar data) and predict occupancy data for the ego's surroundings. The operation described in this example may be executed by any number of computing devices operating in the distributed computing system described in FIGS. 1A and 1B (e.g., a processor of the egos 140.

To train the AI model(s) 110c, the analytics server 110a may first employ one or more of the egos 140 to drive a particular route. While driving, the egos 140 may use one or more of their sensors (including one or more cameras) to generate navigation session data. For instance, the one or more of the egos 140 equipped with various sensors can navigate the designated route. As the one or more of the egos 140 traverse the terrain, their sensors may capture continuous (or periodic) data of their surroundings. The sensors may indicate an occupancy status of the one or more egos' 140 surroundings. For instance, the sensor data may indicate various objects having mass in the surroundings of the one or more of the egos 140 as they navigate their route.

The analytics server 110a may generate a training dataset using data collected from the egos 140 (e.g., camera feed received from the egos 140). The training dataset may indicate the occupancy status of different voxels within the surroundings of the one or more of the egos 140. As used herein in some embodiments, a voxel is a three-dimensional pixel, forming a building block of the surroundings of the one or more of the egos 140. Within the training dataset, each voxel may encapsulate sensor data indicating whether a mass was identified for that particular voxel. Mass, as used herein, may indicate or represent any object identified using the sensor. For instance, in some embodiments, the egos 140 may be equipped with sensors that can identify masses near the egos 140.

In some embodiments, the training dataset may include data received from a camera of the egos 140. The data received from the camera(s) may have a set of data points where each data point corresponds to a location and an image attribute of at least one voxel of space around the ego 140. The training dataset may also include 3D geometry data to indicate whether a voxel of the one or more egos 140 surroundings is occupied by an object having mass or not.

In operation, as the one or more egos 140 navigate, their sensors collect data and transmit the data to the analytics server 110a, as depicted in the data stream 172.

In some embodiments, the one or more egos 140 may include one or more high-resolution cameras that capture a continuous stream of visual data from the surroundings of the one or more egos 140 as the one or more egos 140 navigate through the route. The analytics server 110a may then generate a second dataset using the camera feed where visual elements/depictions of different voxels of the one or more egos' 140 surroundings are included within the second dataset.

In operation, as the one or more egos 140 navigate, their cameras collect data and transmit the data to the analytics server 110a, as depicted in the data stream 172. For instance, the ego computing devices 141 may transmit image data to the analytics server 110a using the data stream 172.

The analytics server 110a may train an AI model using the first and second datasets, whereby the AI model 110c correlates each data point within the first set of data points with a corresponding data point within the second set of data points, using each data point's respective location to train itself, wherein, once trained, the AI model 110c is configured to receive a camera feed from a new ego 140 and predict an occupancy status of at least one voxel of the camera feed.

Using the first and second datasets, the analytics server 110a may train the AI model(s) 110c, such that the AI model(s) 110c may correlate different visual attributes of a voxel (within the camera feed within the second dataset) to an occupancy status of that voxel (within the first dataset). In this way, once trained, the AI model(s) 110c may receive a camera feed (e.g., from a new ego 140) without receiving sensor data and then determine each voxel's occupancy status for the new ego 140.

The analytics server 110a may generate a training dataset that includes the first and second datasets. The analytics server 110a may use the first dataset as ground truth. For instance, the first dataset may indicate the different location of voxels and their occupancy status. The second dataset may include a visual (e.g., a camera feed) illustration of the same voxel. Using the first dataset, the analytics server 110a may label the data, such that data record(s) associated with each voxel corresponding to an object are indicated as having a positive occupancy status.

The labeling of the occupancy status of different voxels may be performed automatically and/or manually. For instance, in some embodiments, the analytics server 110a may use human reviewers to label the data. For instance, as discussed herein, the camera feed from one or more cameras of a vehicle may be shown on an electronic platform to a human reviewer for labeling. Additionally or alternatively, the data in its entirety may be ingested by the AI model(s) 110c where the AI model(s) 110c identifies corresponding voxels, analyzes the first digital map, and correlates the image(s) of each voxel to its respective occupancy status.

Using the ground truth, the AI model(s) 110c may be trained, such that each voxel's visual elements are analyzed and correlated to whether that voxel was occupied by a mass. Therefore, the AI model 110c may retrieve the occupancy status of each voxel (using the first dataset) and use the information as ground truth. The AI model(s) 110c may also retrieve visual attributes of the same voxel using the second dataset.

In some embodiments, the analytics server 110a may use a supervised method of training. For instance, using the ground truth and the visual data received, the AI model(s) 110c may train itself, such that it can predict an occupancy status for a voxel using only an image of that voxel. As a result, when trained, the AI model(s) 110c may receive a camera feed, analyze the camera feed, and determine an occupancy status for each voxel within the camera feed (without the need to use a radar).

The analytics server 110a may feed the series of training datasets to the AI model(s) 110c and obtain a set of predicted outputs (e.g., predicted occupancy status). The analytics server 110a may then compare the predicted data with the ground truth data to determine a difference and train the AI model(s) 110c by adjusting the AI model's 110c internal weights and parameters proportional to the determined difference according to a loss function. The analytics server 110a may train the AI model(s) 110c in a similar manner until the trained AI model's 110c prediction is accurate to a certain threshold (e.g., recall or precision).

Additionally or alternatively, the analytics server 110a may use an unsupervised method where the training dataset is not labeled. Because labeling the data within the training dataset may be time-consuming and may require excessive computing power, the analytics server 110a may utilize unsupervised training techniques to train the AI model 110c.

After the AI model 110c is trained, it can be used by an ego 140 to predict occupancy data of the one or more egos' 140 surroundings. For instance, the AI model(s) 110c may divide the ego's surroundings into different voxels and predict an occupancy status for each voxel. In some embodiments, the AI model(s) 110c (or the analytics server 110a using the data predicted using the AI model 110c) may generate an occupancy map or occupancy network representing the surroundings of the one or more egos 140 at any given time.

In another example of how the AI model(s) 110c may be used, after training the AI model(s) 110c, analytics server 110a (or a local chip of an ego 140) may collect data from an ego (e.g., one or more of the egos 140) to predict an occupancy dataset for the one or more egos 140. This example describes how the AI model(s) 110c can be used to predict occupancy data in real-time or near real-time for one or more egos 140. This configuration may have a processor, such as the analytics server 110a, execute the AI model. However, one or more actions may be performed locally via, for example, a chip located within the one or more egos 140. In operation, the AI model(s) 110c may be executed via an ego 140 locally, such that the results can be used to autonomously navigate itself.

The processor may input, using a camera of an ego object 140, image data of a space around the ego object 140 into an AI model 110c. The processor may collect and/or analyze data received from various cameras of one or more egos 140 (e.g., exterior-facing cameras). In another example, the processor may collect and aggregate footage recorded by one or more cameras of the egos 140. The processor may then transmit the footage to the AI model(s) 110c trained using the methods discussed herein.

The processor may predict, by executing the AI model 110c, an occupancy attribute of a plurality of voxels. The AI model(s) 110c may use the methods discussed herein to predict an occupancy status for different voxels surrounding the one or more egos 140 using the image data received.

The processor may generate a dataset based on the plurality of voxels and their corresponding occupancy attribute. The analytics server 110a may generate a dataset that includes the occupancy status of different voxels in accordance with their respective coordinate values. The dataset may be a query-able dataset available to transmit the predicted occupancy status to different software modules.

In operation, the one or more egos 140 may collect image data from their cameras and transmit the image data to the processor (placed locally on the one or more egos 140) and/or the analytics server 110*a*, as depicted in the data stream 172. The processor may then execute the AI model(s) 110*c* to predict occupancy data for the one or more egos 140. If the prediction is performed by the analytics server 110*a*, then the occupancy data can be transmitted to the one or more egos 140 using the data stream 174. If the processor is placed locally within the one or more egos 140, then the occupancy data is transmitted to the ego computing devices 141 (not shown in FIG. 1A).

Using the methods discussed herein, the training of the AI model(s) 110*c* can be performed such that the execution of the AI model(s) 110*c* may be performed locally on any of the egos 140 (at inference time). The data collected (e.g., navigational data collected during the navigation of the egos 140, such as image data of a trip) can then be fed back into the AI model(s) 110*c*, such that the additional data can improve the AI model(s) 110*c*.

Figure 2:
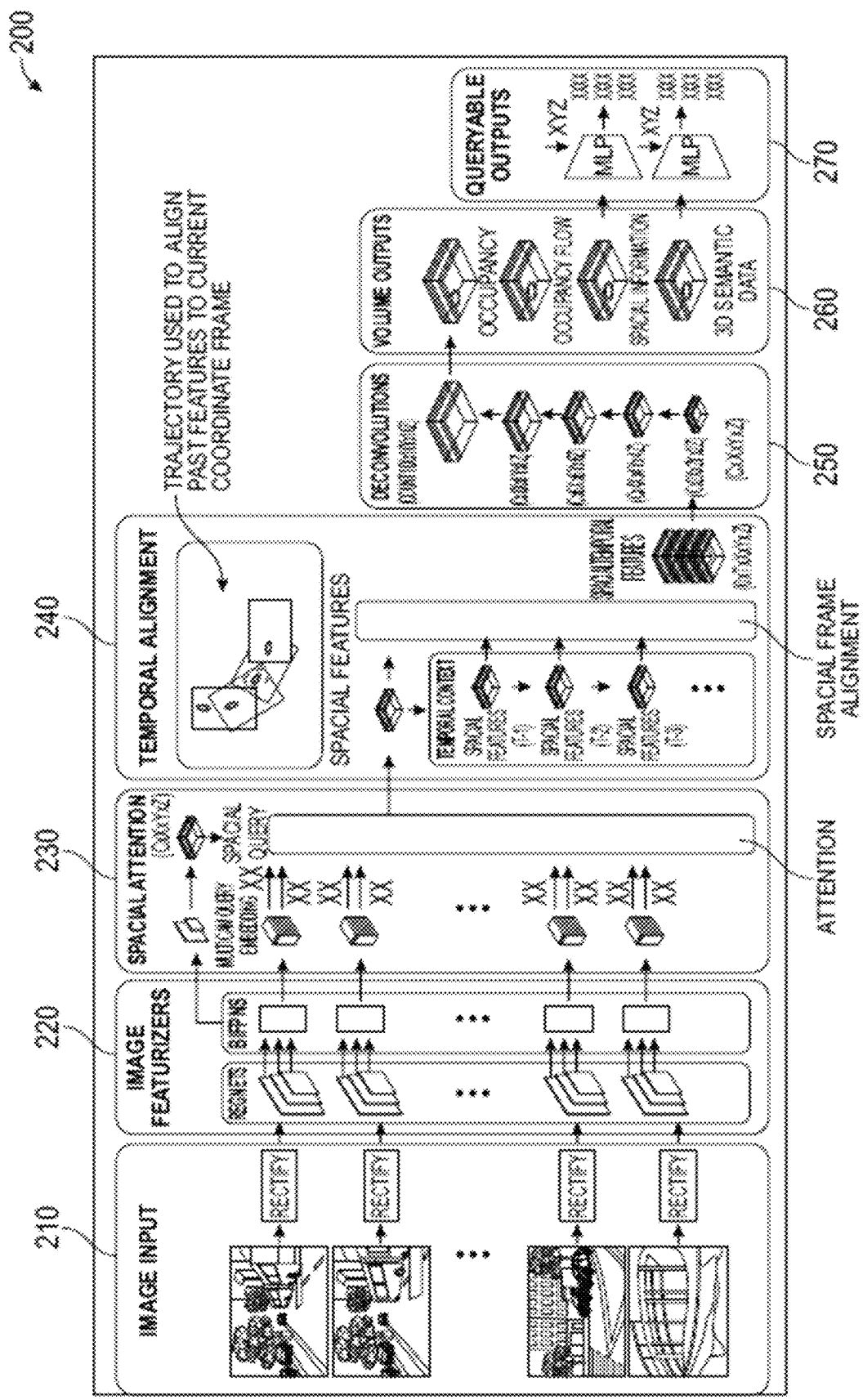
FIG. 2 illustrates a flow diagram of a process executed in an AI-enabled visual data analysis system, according to an embodiment.

FIG. 2 illustrates a flow diagram of a method 200 executed in an AI-enabled, visual data analysis system, according to an embodiment. The method 200 may include steps 210-270. However, other embodiments may include additional or alternative steps or may omit one or more steps. The method 200 is executed by an analytics server (e.g., a computer similar to the analytics server 110*a*). However, one or more steps of the method 200 may be executed by any number of computing devices operating in the distributed computing system described in FIGS. 1A-C (e.g., a processor of the ego 140 and/or ego computing devices 141). For instance, one or more computing devices of an ego may locally perform some or all steps described in FIG. 2.

FIG. 2 illustrates a model architecture of how image inputs can be ingested from an ego (step 210) and analyzed, such that query-able outputs are predicted (step 270). Using the methods and systems discussed herein, the analytics server may only ingest image data (e.g., camera feed from an ego's surroundings) to generate the query-able outputs. Therefore, the methods and systems discussed herein can operate without any data received from radar, LiDAR, or the like.

The query-able outputs (generated in the step 270) can be used for various purposes. In one example, the query-able outputs may be available to an autonomous driving module where various navigational decisions may be made based on whether a voxel of space surrounding an ego is predicted to be occupied. In another example, using the query-able outputs, the analytics server may generate a digital map illustrating the occupancy status of the ego's surroundings. For instance, the analytics server may generate a three-dimensional (3D) geometrical representation of the ego's surroundings. The digital map may be displayed on a computing device of the ego, for example.

As used herein, a voxel may refer to a volumetric pixel and may refer to a 3D equivalent of a pixel in 2D. Accordingly, a voxel may represent a defined point in a 3D grid within a volumetric space or environment around (e.g., surrounding) an ego. In some embodiments, the space surrounding the ego can be divided into different voxels, referred to as a voxel grid. As used herein, a voxel grid may refer to a set of cubes stacked (or arranged) together to represent objects in the space surrounding the ego. Each voxel may contain information about a specific location within the ego's surrounding space. Using the methods and systems discussed herein, an occupancy of each voxel may be evaluated. For instance, the analytics server (using the AI model discussed herein) may determine whether each voxel is occupied with an object having a mass. The voxel predictions may be aggregated into a dataset referred to herein as the query-able results. Using the query-able results, voxel information can be queried by a processor or a downstream software module (e.g., autonomous driving software/processor) to identify occupancy data of the ego's surroundings.

In some embodiments, a voxel may be designated as occupied if any portion of the voxel is occupied. Therefore, in some embodiments, each voxel may include a binary designation of 0 (unoccupied) or 1 (occupied). Alternatively, in some embodiments, the AI model may also predict detailed occupancy data inside/within a particular voxel. For instance, a voxel having a binary value of 1 (occupied) may be further analyzed at a more granular level, such that the occupancy of each point within the voxel is also determined. For instance, an object may be curved. While some of the voxels (associated with the object) are completely occupied, some other voxels may be partially occupied. Those voxels may be divided into smaller voxels, such that some of the smaller voxels are unoccupied. As described herein, this method can be used to identify the shape of the object.

The method 200 starts with step 210 in which image data is received from one or more cameras of an ego. The method 200 visually illustrates how an AI model (trained using the methods discussed herein) can ingest the image data and generate query-able outputs that can indicate a volumetric occupancy of various voxels within an ego's surroundings. The image data may refer to any data received from one or more images of the ego.

The captured image data may then be featurized (step 220). An image featurizer or various featurization algorithms may be used to extract relevant and meaningful features from the image data received. Using the image featurizer, the image data may be transformed into data representations that capture important information about the content of the image. This allows the image data to be analyzed more efficiently.

In some embodiments, the AI model may perform the featurization discussed herein. In some other embodiments, a convolutional neural network may be used to featurize the image data. In one non-limiting example, as depicted, a RegNet (Regularized Neural Networks) may be used to transform the data into a BiFPN (Bi-directional Feature Pyramid Network). However, other protocols may also be used. In some other embodiments, a transformer may be used to featurize the image data.

After the image data is encoded/featurized, a transformer may be used to change the image data from 2D images into 3D images (step 230). As discussed herein, in an example configuration, there may be eight distinct cameras in communication with the ego. As a result, the image data may include eight distinct camera feeds (one feed corresponding to each camera or other sensor) and may include overlapping views. The transformer may aggregate these separate camera feeds and generate one or more 3D representations using the received camera feeds.

The transformer may ingest three separate inputs: image key, image value, and 3D queries. The image key and image value may refer to attributes associated with the 2D image data received from the ego. For instance, these values may be outputted via image featurization (step 220). The transformer may also use an image query from the 3D space. The depicted spatial attention module may use a 3D query to analyze the 2D image key and image value. As depicted, the BiFPNs generated in the step 220 may be aggregated into a multi-camera query embedding and may be used to perform 3D spatial queries. In some embodiments, each voxel may have its own query. Using the 3D spatial query, the analytics server may identify a region within the 2D featurized image corresponding to a particular portion of the 3D representation. The identified region within the featurized image may then be analyzed to transform the multi-camera image data into a 3D representation of each voxel, which may produce a 3D representation of the ego's surroundings. Accordingly, the depicted spatial attention module may output a single 3D vector space representing the ego's surroundings. This, in effect, moves all the image data generated by all camera feeds into a top-down space or a 3D space representation of the ego's surroundings.

The steps 210-230 may be performed for each video frame received from each camera of the ego. For instance, at each timestamp, the steps 210-230 may be performed on eight distinct images received from the ego's eight different cameras. As a result, at each timestamp, the method 200 may produce one 3D space representation of the eight images. At step 240, the method 200 may fuse the 3D spaces (for different timestamps) together. This fusion may be done based on a timestamp of each set of images. For instance, the 3D space representations may be fused based on their respective timestamps (e.g., in a consecutive manner).

As depicted, the 3D space representation at timestamp t may be fused with the 3D space representation of the ego's surroundings at t−1, t−2, and t−3. As a result, the output may have both spatial and temporal information. This concept is depicted in FIG. 2 as the spatial-temporal features.

The spatial-temporal features may then be transformed into different voxels using deconvolution (step 250). As discussed herein, various data points are featurized and fused together. In this step 250, the method 200 may perform various mathematical operations to reverse this process, such that the fused data can be transformed back into different voxels. Deconvolution, as used herein, may refer to a mathematical operation used to reverse the effects of convolution.

Figure 3A:
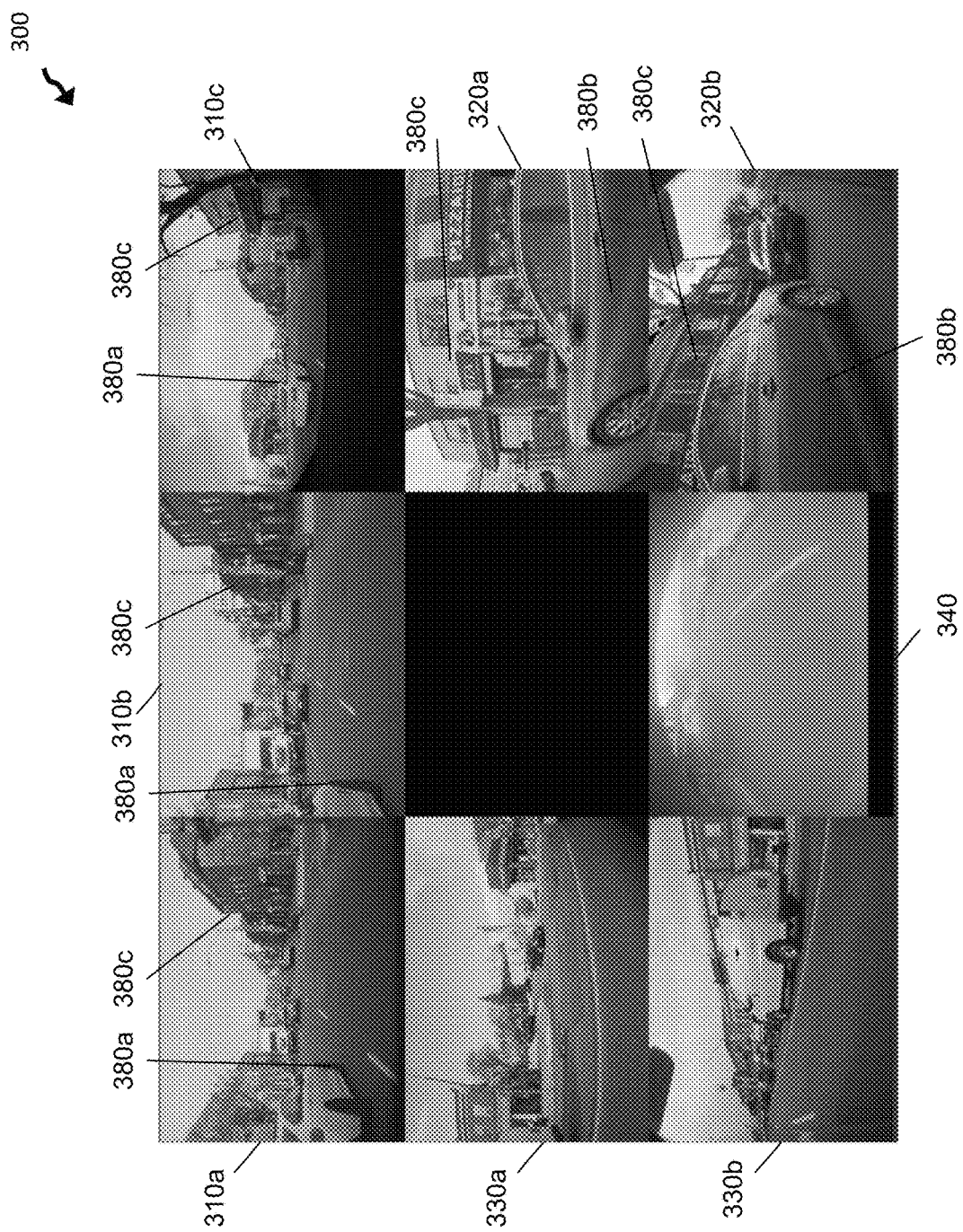
FIGS. 3A-B illustrate different occupancy maps generated in an AI-enabled visual data analysis system, according to an embodiment.
Figure 3B:
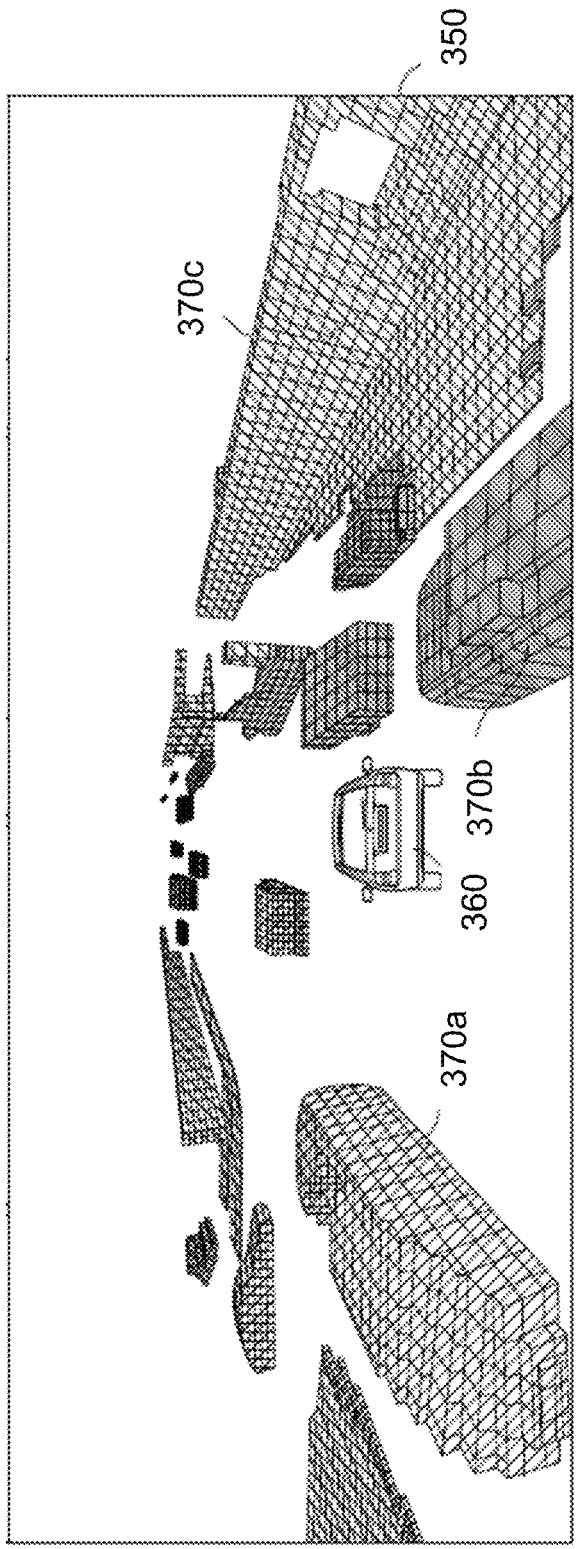

After applying deconvolution to the image data (that has been featurized, transformed, and fused), the method 200 may then apply various trained AI modeling techniques discussed herein (e.g., FIGS. 3-4) to generate volume outputs (step 260). The volume output may include binary data for different voxels indicating whether a particular voxel is occupied by an object having mass. Specifically, the volume output may include occupancy data, including binary data, indicating whether a voxel is occupied and/or occupancy flow data indicating how fast (if at all) the voxel is moving (velocity being calculated using the temporal alignment).

The volume output may also include shape information (the shape of the mass occupying the voxel). In some embodiments, the size of each voxel may be predetermined, though the size may be revised to produce more granular results. For instance, the default size of different voxels may be 33 centimeters (each vertex). While this size is generally acceptable for voxels, the results can be improved by reducing the size of the voxels. For instance, if a voxel is detected to be outside of the ego's driving surface, the 33 cm voxel may be appropriate. However, the analytics server may reduce the size of voxels (e.g., to 10 cm) that are occupied and within a threshold distance from the ego and/or the ego's driving surface. When the voxel occupancy data is identified, a regression model may be executed, such that the shape of the group of voxels is identified. For instance, a 33 cm voxel (that belongs to a curb) may be half occupied (e.g., only 16 cm of the voxel is occupied). The analytics server may use regression to determine how much of the voxel is occupied.

Additionally or alternatively, the analytics server may decode a sub-voxel value to identify the shape of the sub-voxels (inside of an occupied voxel). For instance, if a voxel is half occupied, the analytics server may define a set of sub-voxels and use the methods discussed herein to identify volume outputs for the sub-voxels. When the sub-voxels are aggregated (back into the original voxel), the analytics server may determine a shape for the voxel. For instance, each voxel may have eight vertices. In some embodiments, each vertex can be analyzed separately and have its embeddings. As a result, any point within each vertex of the voxel can be queried separately. Therefore, in this "continuous resolution" approach, the analytics server may not define a size for the sub-voxel. In some embodiments, the analytics server may use a multi-variant interpolation (e.g., trilinear interpolation) protocol to estimate the occupancy status of each sub-voxel and/or any point within each vertex.

The volume output may also include 3D semantic data indicating the object occupying the voxel (or a group of voxels). The 3D semantic may indicate whether the voxel and/or a group of nearby voxels are occupied by a car, street curb, building, or other objects. The 3D semantic may also indicate whether the voxel is occupied by a static or moving mass. The 3D semantic data may be identified using various temporal attributes of the voxel. For instance, if a group of voxels is identified to be occupied by a mass, the collective shape of the voxels may indicate that the voxels belong to a vehicle. If, at a previous timestamp, the identified group of voxels (now known to be a vehicle) was identified as moving, then the group of voxels may have a 3D semantic indicating that the group of voxels belongs to a moving vehicle. In another example, if a group of voxels are identified to have a shape corresponding to a curb and are not identified as having any movements, the group of voxels may have a 3D semantic indicating a static curb.

In some embodiments, certain shapes or 3D semantics may be prioritized. For instance, certain objects, such as other vehicles on the road or objects associated with driving surfaces (e.g., curbs indicating the outer limits of the road) may be thoroughly analyzed. In contrast, details of static objects, such as a building nearby that is far from the ego's driving surface, may not be analyzed as thoroughly as a moving vehicle near the ego. In some embodiments, certain objects having a particular size or shape may be ignored. For instance, road debris may not be analyzed as much as a moving vehicle near the ego.

In some embodiments, an object-level detection may not need to be performed by the method 200. For instance, the ego must navigate around to avoid a voxel in front of the ego that has been identified as static and occupied, regardless of whether the voxel belongs to another vehicle, a pedestrian, or a traffic sign. Therefore, the occupancy information may be object-agnostic. In some embodiments, an object detection model may be executed separately (e.g., in parallel) that can detect the objects that correspond to various groups of voxels.

At step 270, the method 200 may generate a query-able dataset that allows other software modules to query the occupancy statuses of different voxels. For instance, a software module may transmit coordinate values (X, Y, and Z axis) of the ego's surroundings and may receive any of the four categories of occupancy data generated using the method 200 (e.g., volume output). The query-able dataset may be used to generate an occupancy map (e.g., FIGS. 3A-B) or may be used to make autonomous navigation decisions for the ego.

Additionally or alternatively, the analytics server may generate a map corresponding to the predicted occupancy status of different voxels. In a non-limiting example, the analytics server may use a multi-view 3D reconstruction protocol to visualize each voxel and its occupancy status. A non-limiting example of the map or occupancy map is presented in FIGS. 3A-B (e.g., a simulation 350). In some embodiments, the simulation 350 may be displayed on a user interface of an ego. The simulation 350 may illustrate camera feeds 300 depicted in FIG. 3A. The camera feeds 300 represent image data received from eight different cameras of an ego (whether in real-time or near real-time). Specifically, the camera feed 300 may include camera feeds 310a-c received from three different front-facing cameras of the ego; camera feeds 320a-b received from two different right-side-facing cameras of the ego; camera feeds 330a-b received from two different left-side-facing cameras of the ego; and camera feed 340 received from a rear-facing camera of the ego.

Using the methods discussed herein, the analytics server may analyze the camera feeds 300, divide the space surrounding the ego into voxels, and generate the simulation 350 (depicted in FIG. 3B) that is a graphical representation of the ego's surrounding. The simulation 350 may include a simulated ego (360) and its surrounding voxels. For instance, the simulation 350 may include a graphical indicator for different masses occupying different voxels surrounding the simulated ego 360. For instance, the simulation 350 may include simulated masses 370a-c.

Each simulated mass 370a-c may represent an object depicted within the camera feeds 300. For instance, the simulated mass 370a corresponds to a mass 380a (vehicle); the simulated mass 370b corresponds to a mass 380b (vehicle); and the simulated mass 370c may correspond to a mass 380c (buildings near the road). As depicted, every simulated mass includes various voxels. Moreover, the voxels depicted within the simulation 350 may have distinct graphical/visual characteristics that correspond to their volume outputs (e.g., occupancy data). For instance, the simulated mass 370c (e.g., a building) may have a first color indicating that it has been identified as static. Likewise, simulated mass 370b (e.g., a vehicle) may have a second color indicating that it is a parked or stationary vehicle. In contrast, simulated mass 370a (e.g., another vehicle) may have a third color and/or other visual characteristics indicating that it is predicted to be moving.

Additionally or alternatively, the analytics server may transmit the generated map to a downstream software application or another server. The predicted results may be further analyzed and used in various models and/or algorithms to perform various actions. For instance, a software model or a processor associated with the autonomous navigation system of the ego may receive the occupancy data predicted by the trained AI model, according to which navigational decisions may be made.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or a machine-executable instruction may represent a procedure, function, subprogram, program, routine, subroutine, module, software package, class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code, it being understood that software and control hardware can be designed to implement the systems and methods based on the description herein.

When implemented in software, the functions may be stored as one or more instructions or code on a non-transitory, computer-readable, or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitates the transfer of a computer program from one place to another. A non-transitory, processor-readable storage media may be any available media that can be accessed by a computer. By way of example, and not limitation, such non-transitory, processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that can be accessed by a computer or processor. Disk and disc, as used herein, include compact disc (CD), laser disc, optical disc, digital versatile disc (DVD), Blu-ray disc, and floppy disk, where "disks" usually reproduce data magnetically, while "discs" reproduce data optically with lasers. Combinations of the above should also be included within the scope of computer-readable media. Additionally, the operations of a method or algorithm may reside as one or any combination or set of codes and/or instructions on a non-transitory, processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method for generating a three-dimensional occupancy grid of a space around an ego object based on two-dimensional visual data, the method comprising:
   inputting, by a processor using a camera of an ego object configured to navigate a space, periodically captured two-dimensional (2D) visual data from the camera of the space around the ego object into an artificial intelligence model to cause the artificial intelligence model to generate an output using image data comprising only the 2D visual data from the camera;
   periodically predicting, by the processor executing the artificial intelligence model using only the captured 2D visual data from the camera, an occupancy attribute of 3D occupancy data; and
   generating, by the processor using only the captured 2D visual data from the camera, a dataset based on the 3D occupancy data and their corresponding occupancy attribute.

2. The method of claim 1, further comprising:
   generating, by the processor, an output representing an environment of the ego object and illustrating the 3D occupancy data and corresponding occupancy attributes, wherein the output comprises a graphical indicator of the occupancy attribute for at least a portion of the 3D occupancy data.

3. The method of claim 2, wherein the graphical indicator corresponds to a detected object associated with the at least the portion of the plurality of vexels 3D occupancy data.

4. The method of claim 2, further comprising:
   displaying, by the processor, the output on a screen associated with the ego object.

5. The method of claim 1, wherein the dataset is a queryable dataset configured to transmit the occupancy attribute of the 3D occupancy data to an autonomous driving protocol of the ego object.

6. The method of claim 1, wherein the artificial intelligence model is trained using a sensor attribute of the 3D occupancy data.

7. The method of claim 1, wherein the ego object is an autonomous vehicle executing a driving protocol based on the dataset.

8. The method of claim 1, further comprising:
   featurizing, by the processor, the 2D visual data prior to executing the artificial intelligence model.

9. The method of claim 1, wherein the 2D visual data comprises a plurality of camera feeds from a plurality of cameras of the ego object, the method further comprising:
   temporally aligning, by the processor, the plurality of camera feeds.

10. An ego object comprising:
    a camera;
    a first processor;
    a second processor;
    a non-transitory computer-readable medium containing an artificial intelligence model configured to be executed by the first processor, wherein the first processor is configured to:
    input, using the camera of the ego object configured to navigate a space, periodically captured two-dimensional (2D) visual data from the camera of the space around the ego object into the artificial intelligence model to cause the artificial intelligence model to generate an output using image data comprising only the 2D visual data from the camera;
    periodically predict, executing the artificial intelligence model using only the captured 2D visual data from the camera, an occupancy attribute of a plurality of voxels 3D occupancy data; and
    generate, using only the captured 2D visual data from the camera, a dataset based on the 3D occupancy data and their corresponding occupancy attribute,
    wherein the second processor is configured to:
    autonomously navigate the ego object using the dataset.

11. The ego object of claim 10, wherein the first processor is further configured to:
    generate an output representing an environment of the ego object and illustrating the 3D occupancy data and their corresponding occupancy attribute, wherein the output comprises a graphical indicator of the occupancy attribute for at least a portion of the 3D occupancy data.

12. The ego object of claim 11, wherein the graphical indicator corresponds to a detected object associated with the at least the portion of the 3D occupancy data.

13. The ego object of claim 11, wherein the first processor is further configured to:
    display the output on a screen associated with the ego object.

14. The ego object of claim 10, wherein the artificial intelligence model is trained using a sensor attribute of the 3D occupancy data.

15. The ego object of claim 10, wherein the ego object is an autonomous vehicle executing a driving protocol based on the dataset.

16. A method comprising:
    training, by a processor, an artificial intelligence model using a training dataset comprising first two-dimensional (2D) visual data received from a camera of an ego object, the training dataset having a first set of data points where each data point within the set of data points corresponds to a location and an image attribute of 3D occupancy data of space around the ego object,
    whereby the artificial intelligence model correlates each data point within the first set of data points with a corresponding data point within a second set of data points using locations for each data point,
    whereby, when the artificial intelligence model is trained, the artificial intelligence model is configured to receive a camera feed comprising second 2D visual data from a second ego object configured to navigate a space and periodically predict, using only the second 2D visual data, a third set of data points using only the camera feed, where each data point within the third set of data points corresponds an occupancy attribute indicating whether at least a portion of the 3D occupancy data of space around the second ego object is occupied by any object having mass.

17. The method of claim 16, wherein the artificial intelligence model is further configured to generate an output representing an environment of the ego object and illustrating the 3D occupancy data and their corresponding occupancy attribute.

18. The method of claim 16, wherein the training dataset further comprises a second set of data points where each data point within the second set of data points corresponds to the location and a sensor attribute of 3D occupancy data of the space around the ego object.

19. The method of claim 17, wherein a graphical indicator corresponds to a detected object associated with at least portion of the 3D occupancy data.

20. The method of claim 17, wherein the artificial intelligence model uses a three-dimensional multiview reconstruction protocol to generate the output.

* * * * *